(12) United States Patent
Garza et al.

(10) Patent No.: US 8,307,114 B2
(45) Date of Patent: Nov. 6, 2012

(54) HIGH AVAILABILITY MESSAGE TRANSMISSION

(75) Inventors: Jose Emir Garza, Richmond (GB); Stephen James Hobson, Middlesex (GB); John Brian Pickering, Winchester (GB); Timothy Vincent Pickrell, Landford (GB); Steven Powell, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 740 days.

(21) Appl. No.: 12/124,921

(22) Filed: May 21, 2008

(65) Prior Publication Data

US 2008/0294714 A1 Nov. 27, 2008

(30) Foreign Application Priority Data

May 22, 2007 (EP) .................................... 07108662

(51) Int. Cl.
*G06F 15/16* (2006.01)
(52) U.S. Cl. ....................................... 709/238; 709/206
(58) Field of Classification Search .................. 709/206, 709/217, 227, 228, 236, 203, 238; 719/313, 719/314, 318
See application file for complete search history.

(56) References Cited

U.S. PATENT DOCUMENTS

| | | | |
|---|---|---|---|
| 5,537,417 A | 7/1996 | Sharma et al. | |
| 5,541,911 A | 7/1996 | Nilakantan et al. | |
| 5,634,005 A | 5/1997 | Matsuo | |
| 5,796,633 A | 8/1998 | Burgess et al. | |
| 5,822,527 A | 10/1998 | Post | |
| 5,887,134 A | 3/1999 | Ebrahim | |
| 5,905,724 A | 5/1999 | Carson et al. | |
| 5,995,503 A | 11/1999 | Crawley et al. | |
| 6,055,413 A | 4/2000 | Morse et al. | |
| 6,073,165 A | 6/2000 | Narasimhan et al. | |
| 6,101,545 A | 8/2000 | Balcerowski et al. | |
| 6,104,700 A | 8/2000 | Haddock et al. | |
| 6,130,880 A | 10/2000 | Naudus et al. | |
| 6,131,123 A | 10/2000 | Hurst et al. | |
| 6,144,987 A | 11/2000 | Niemi | |
| 6,154,778 A * | 11/2000 | Koistinen et al. | 709/228 |
| 6,154,781 A | 11/2000 | Bolam et al. | |
| 6,167,445 A | 12/2000 | Gai et al. | |
| 6,256,664 B1 | 7/2001 | Donoho et al. | |
| 6,263,362 B1 | 7/2001 | Donoho et al. | |
| 6,286,052 B1 | 9/2001 | McCloghrie et al. | |
| 6,334,151 B1 | 12/2001 | Bolam et al. | |
| 6,366,950 B1 | 4/2002 | Scheussler et al. | |
| 6,381,630 B1 | 4/2002 | Niemi | |

(Continued)

OTHER PUBLICATIONS

Andrew I. Hickson et al., U.S. Appl. No. 10/016,906, filed Dec. 14, 2001, Office Action, Jun. 10, 2005, 7 pages.

(Continued)

*Primary Examiner* — Wing Chan
*Assistant Examiner* — Ruolei Zong
(74) *Attorney, Agent, or Firm* — Marcia L. Doubet

(57) ABSTRACT

A system, method, apparatus, and computer program product uses a plurality of message transmitters to achieve high availability message transmission. The plurality of message transmitters are each operable to transmit a message to a subscriber. In accordance with a determination, for example, of the value of the connections, the message is copied and transmitted to the plurality of the message transmitters so that at least one of the plurality of message transmitters transmits the copy to the subscriber. The at least one message transmitter may be selected by analyzing the message and determining an associated rule based on characteristics of the message.

17 Claims, 12 Drawing Sheets

U.S. PATENT DOCUMENTS

| | | | |
|---|---|---|---|
| 6,405,266 | B1 | 6/2002 | Bass et al. |
| 6,430,602 | B1 | 8/2002 | Kay et al. |
| 6,463,470 | B1 | 10/2002 | Mohaban et al. |
| 6,487,548 | B1 | 11/2002 | Leymann et al. |
| 6,505,253 | B1 | 1/2003 | Chiu et al. |
| 6,571,140 | B1 | 5/2003 | Wewalaarachchi et al. |
| 6,622,175 | B1 | 9/2003 | Piller |
| 6,631,399 | B1 | 10/2003 | Stanczak et al. |
| 6,633,630 | B1 | 10/2003 | Owens et al. |
| 6,654,787 | B1 | 11/2003 | Aronson et al. |
| 6,658,000 | B1 | 12/2003 | Raciborski et al. |
| 6,714,987 | B1 | 3/2004 | Amin et al. |
| 6,728,779 | B1 | 4/2004 | Griffin et al. |
| 6,826,606 | B2 | 11/2004 | Freeman et al. |
| 6,839,734 | B1 | 1/2005 | Vega-Garcia et al. |
| 6,839,748 | B1 | 1/2005 | Allavarpu et al. |
| 6,842,773 | B1 | 1/2005 | Ralston et al. |
| 6,879,998 | B1 | 4/2005 | Raciborski et al. |
| 6,909,692 | B1 | 6/2005 | Sharma et al. |
| 6,999,992 | B1 | 2/2006 | Deen et al. |
| 7,110,406 | B1 * | 9/2006 | Ennis et al. ............ 370/390 |
| 7,240,097 | B2 | 7/2007 | Holdsworth et al. |
| 7,299,291 | B1 * | 11/2007 | Shaw ..................... 709/231 |
| 7,653,872 | B2 * | 1/2010 | Yamashita et al. ........ 715/230 |
| 2001/0027479 | A1 | 10/2001 | Delaney et al. |
| 2002/0023172 | A1 | 2/2002 | Gendron et al. |
| 2002/0120600 | A1 | 8/2002 | Schiavone et al. |
| 2002/0143951 | A1 | 10/2002 | Khan et al. |
| 2002/0165903 | A1 | 11/2002 | Zargham et al. |
| 2002/0169954 | A1 | 11/2002 | Bandini et al. |
| 2003/0046421 | A1 | 3/2003 | Horvitz et al. |
| 2003/0110230 | A1 | 6/2003 | Holdsworth et al. |
| 2003/0115317 | A1 | 6/2003 | Hickson et al. |
| 2003/0135556 | A1 * | 7/2003 | Holdsworth ............. 709/206 |
| 2004/0233845 | A1 * | 11/2004 | Jeong et al. ............. 370/230 |
| 2005/0021843 | A1 * | 1/2005 | Duigenan et al. ........ 709/238 |
| 2007/0204275 | A1 * | 8/2007 | Alshab et al. ........... 719/313 |
| 2008/0243990 | A1 * | 10/2008 | Mallik et al. ............ 709/203 |

OTHER PUBLICATIONS

Andrew I. Hickson et al., U.S. Appl. No. 10/016,906, filed Dec. 14, 2001, Office Action, Nov. 30, 2005, 6 pages.
Andrew I. Hickson et al., U.S. Appl. No. 10/016,906, filed Dec. 14, 2001, Office Action, Mar. 28, 2006, 8 pages.
Andrew I. Hickson et al., U.S. Appl. No. 10/016,906, filed Dec. 14, 2001, Office Action, Aug. 31, 2006, 9 pages.
Andrew I. Hickson et al., U.S. Appl. No. 10/016,906, filed Dec. 14, 2001, Examiner's Answer, Jun. 12, 2007, 15 pages.
Andrew I. Hickson et al., U.S. Appl. No. 10/016,906, filed Dec. 14, 2001, Reply Brief Noted, Aug. 27, 2007, 3 pages.
Andrew I. Hickson et al., U.S. Appl. No. 10/016,906, filed Dec. 14, 2001, Appeal Docketing Notice, Jan. 22, 2008, 2 pages.
Andrew I. Hickson et al., U.S. Appl. No. 10/016,906, filed Dec. 14, 2001, Order Returning Undocketed Appeal, Sep. 3, 2008, 4 pages.
Andrew I. Hickson et al., U.S. Appl. No. 10/016,906, filed Dec. 14, 2001, Examiner's Answer, Oct. 24, 2008, 15 pages.
Andrew I. Hickson et al., U.S. Appl. No. 10/016,906, filed Dec. 14, 2001, Order Returning Undocketed Appeal, Apr. 14, 2009, 3 pages.
Andrew I. Hickson et al., U.S. Appl. No. 10/016,906, filed Dec. 14, 2001, Reply Brief Noted, May 20, 2009, 2 pages.
Andrew I. Hickson et al., U.S. Appl. No. 10/016,906, filed Dec. 14, 2001, Appeal Docketing Notice, Jun. 12, 2009, 2 pages.
Simon A. Holdsworth et al., U.S. Appl. No. 10/016,935, filed Dec. 14, 2001, Office Action, Feb. 10, 2005, 14 pages.
Simon A. Holdsworth et al., U.S. Appl. No. 10/016,935, filed Dec. 14, 2001, Office Action, Aug. 8, 2005, 23 pages.
Simon A. Holdsworth et al., U.S. Appl. No. 10/016,935, filed Dec. 14, 2001, Office Action, Dec. 14, 2005, 17 pages.
Simon A. Holdsworth et al., U.S. Appl. No. 10/016,935, filed Dec. 14, 2001, Examiner's Answer, Sep. 8, 2006, 16 pages.
Simon A. Holdsworth et al., U.S. Appl. No. 10/016,935, filed Dec. 14, 2001, Reply Brief Noted, Nov. 2, 2006, 2 pages.
Simon A. Holdsworth et al., U.S. Appl. No. 10/016,935, filed Dec. 14, 2001, Order Returning Undocketed Appeal, May 9, 2007, 4 pages.
Simon A. Holdsworth et al., U.S. Appl. No. 10/016,935, filed Dec. 14, 2001, Order Returning Undocketed Appeal, Oct. 5, 2007, 3 pages.
Simon A. Holdsworth et al., U.S. Appl. No. 10/016,935, filed Dec. 14, 2001, Reply Brief Noted, Nov. 23, 2007, 2 pages.
Simon A. Holdsworth et al., U.S. Appl. No. 10/016,935, filed Dec. 14, 2001, Appeal Docketing Notice, Apr. 2, 2008, 3 pages.
Simon A. Holdsworth et al., U.S. Appl. No. 10/016,935, filed Dec. 14, 2001, BPAI Decision, Mar. 17, 2009, 18 pages.
Simon A. Holdsworth et al., U.S. Appl. No. 10/016,935, filed Dec. 14, 2001, Rehearing Request Denied, Jun. 16, 2009, 8 pages.
Simon A. Holdsworth et al., U.S. Appl. No. 10/016,935, filed Dec. 14, 2001, Office Action, Oct. 27, 2009, 14 pages.
Simon A. Holdsworth et al., U.S. Appl. No. 10/016,935, filed Dec. 14, 2001, Office Action, May 13, 2010, 14 pages.
Simon A. Holdsworth et al., U.S. Appl. No. 10/085,300, filed Feb. 28, 2002, Office Action, Apr. 8, 2005, 9 pages.
Simon A. Holdsworth et al., U.S. Appl. No. 10/085,300, filed Feb. 28, 2002, Office Action, Oct. 5, 2005, 10 pages.
Simon A. Holdsworth et al., U.S. Appl. No. 10/085,300, filed Feb. 28, 2002, Office Action, Jun. 28, 2006, 13 pages.
Simon A. Holdsworth et al., U.S. Appl. No. 10/085,300, filed Feb. 28, 2002, Examiner's Interview Summary, Mar. 8, 2007, 2 pages.
Simon A. Holdsworth et al., U.S. Appl. No. 10/085,300, filed Feb. 28, 2002, Notice of Allowance, Mar. 8, 2007, 8 pages.
Simon A. Holdsworth et al., U.S. Appl. No. 10/016,935, filed Dec. 14, 2001, Office Action, Oct. 22, 2010, 17 pages.
Bolam S., et al, IBM Technical Disclosure Article No. 41982, "Managing Topology Changes in a Message Broker Environment", Mar. 1999.
"IBM Lakes—An Architecture for Collaborative Networking", R. Morgan Publishing, UK, 1994, Chapter 1, Architecture Fundamentals.

* cited by examiner

FIG. 7

Table 2:

| Publisher identification | Last sequence identifier received | Gap detected by Broker 1 | Last sequence identifier from Broker 1 (after gap detected) | Gap detected by Broker 2 | Last sequence identifier from Broker 2 (after gap detected) |
|---|---|---|---|---|---|
| P1 | MSG_1 | | | | |

Table 3:

| Publisher identification | Last sequence identifier received | Gap detected by Broker 1 | Last sequence identifier from Broker 1 (after gap detected) | Gap detected by Broker 2 | Last sequence identifier from Broker 2 (after gap detected) |
|---|---|---|---|---|---|
| P1 | MSG_1 | YES | MSG_3 | | |

FIG. 7 continued

Table 4:

| Publisher identification | Last sequence identifier received | Gap detected by Broker 1 | Last sequence identifier from Broker 1 (after gap detected) | Gap detected by Broker 2 | Last sequence identifier from Broker 2 (after gap detected) |
|---|---|---|---|---|---|
| P1 | MSG_3 | YES | MSG_3 | | |

Table 5:

| Publisher identification | Last sequence identifier received | Gap detected by Broker 1 | Last sequence identifier from Broker 1 (after gap detected) | Gap detected by Broker 2 | Last sequence identifier from Broker 2 (after gap detected) |
|---|---|---|---|---|---|
| P1 | MSG_4 | YES | MSG_3 | | |

FIG. 7 continued

Table 6:

| Publisher identification | Last sequence identifier received | Gap detected by Broker 1 | Last sequence identifier from Broker 1 (after gap detected) | Gap detected by Broker 2 | Last sequence identifier from Broker 2 (after gap detected) |
|---|---|---|---|---|---|
| P1 | MSG_2 | YES | MSG_3 | | |

Table 7:

| Publisher identification | Last sequence identifier received | Gap detected by Broker 1 | Last sequence identifier from Broker 1 (after gap detected) | Gap detected by Broker 2 | Last sequence identifier from Broker 2 (after gap detected) |
|---|---|---|---|---|---|
| P1 | MSG_1 | YES | MSG_3 | YES | MSG_3 |

US 8,307,114 B2

HIGH AVAILABILITY MESSAGE TRANSMISSION

BACKGROUND OF THE INVENTION

The present invention relates to message transmission.

Publish and Subscribe (pub/sub) is an effective way of disseminating information to multiple users. Pub/Sub applications can help to simplify the task of getting business messages and transactions to a wide, dynamically changing and potentially large audience in a timely manner.

In a pub/sub system, publishers are not concerned with where their messages are going, and subscribers are not interested in where the messages they receive have come from. Instead, a message broker typically assures the integrity of the message source and manages the distribution of a message according to subscriptions registered in the message broker.

With reference to a pub/sub system (100) as shown in FIG. 1, instead of including a specific destination address in each message, a publisher (105) assigns a topic to a message. A message broker (112) residing on a first computer system (110) comprises a matching engine for matching a topic of a published message with a list of subscribers (120) who have subscribed to receive messages that are published to that topic. In response to a match, the message broker (112) sends the published message to the subscriber (120).

Typically, in order to provide high availability in such a messaging system, a pair of computer systems (110 and 115) is used. A second (standby) computer system (115) monitors a "heartbeat" signal from the first computer system (110). If the second computer system (115) fails to detect a "heartbeat" signal from the first computer system (110), this may be due to failure of the message broker (112) or another component residing on the first computer system (110). In response to failing to detect a "heartbeat" signal, the second computer system (115) "takes over" from the first computer system (110). For example, the second computer system (115) takes over an IP address associated with the first computer system (110). The second computer system (115) can also restart any failed components on the first computer system (110) (e.g. the message broker (112)).

Such a high availability configuration has a number of drawbacks.

Take over by the second computer system (115) of the first computer system (110) can cause delays during which processing of messages cannot occur. To many users, this delay constitutes an unacceptable outage.

Furthermore, when a heartbeat signal fails to be detected, it can be uncertain as to whether this is due to a failed component or due to a failure of the heartbeat signal itself.

Thus, if the second computer system (115) takes over from a "healthy" (i.e. not failed) first computer system (110), the second computer system (115) causes a disruption that effectively is an outage, that is, the very problem high availability sets out to avoid. Furthermore, this can also result in inconsistent and competing systems, with loss of information continuity and high contention for common resources.

There is thus a need for an improved mechanism for providing high availability.

DISCLOSURE OF THE INVENTION

According to a first aspect, there is provided an apparatus for message transmission for use with a system comprising: a message generator for generating a message and a plurality of message transmitters, each operable to transmit the message to a subscriber, the apparatus comprising: a determiner, responsive to the message generator generating a first message, for determining data associated with the plurality of message transmitters; a message copier for copying the first message; and a transmitter for using the data to transmit a copy of the first message to the plurality of message transmitters, for subsequent transmission of a copy of the first message by at least one of the plurality of message transmitters to the subscriber.

According to a second aspect, there is provided a method for message transmission for use with a system comprising: a message generator for generating a message and a plurality of message transmitters, each operable to transmit the message to a subscriber, the method comprising the steps of: determining in response to the message generator generating a first message data associated with the plurality of message transmitters; copying the first message; and using the data to transmit a copy of the first message to the plurality of message transmitters, for subsequent transmission of a copy of the first message by at least one of the plurality of message transmitters to the subscriber.

According to a third aspect, there is provided a computer program comprising program code means adapted to perform all the steps of the method described above when said program is run on a computer.

BRIEF DESCRIPTION OF THE DRAWINGS

The present invention will now be described, by way of example only, with reference to embodiments thereof, as illustrated in the following drawings:

FIG. 7 is a representation of a number of in memory tables.

DETAILED DESCRIPTION OF THE INVENTION

Figure 1:
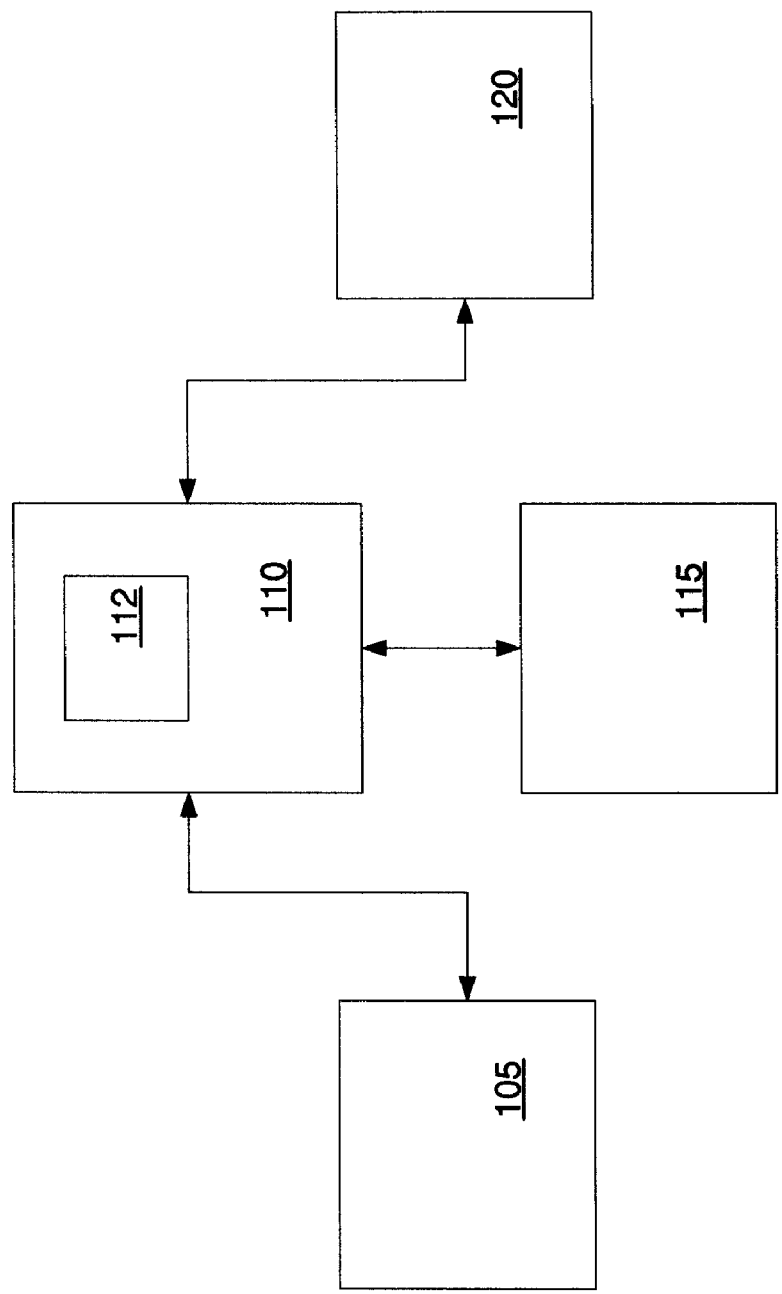
FIG. 1 is a block diagram of a prior art publish/subscribe system providing high availability.
Figure 2:
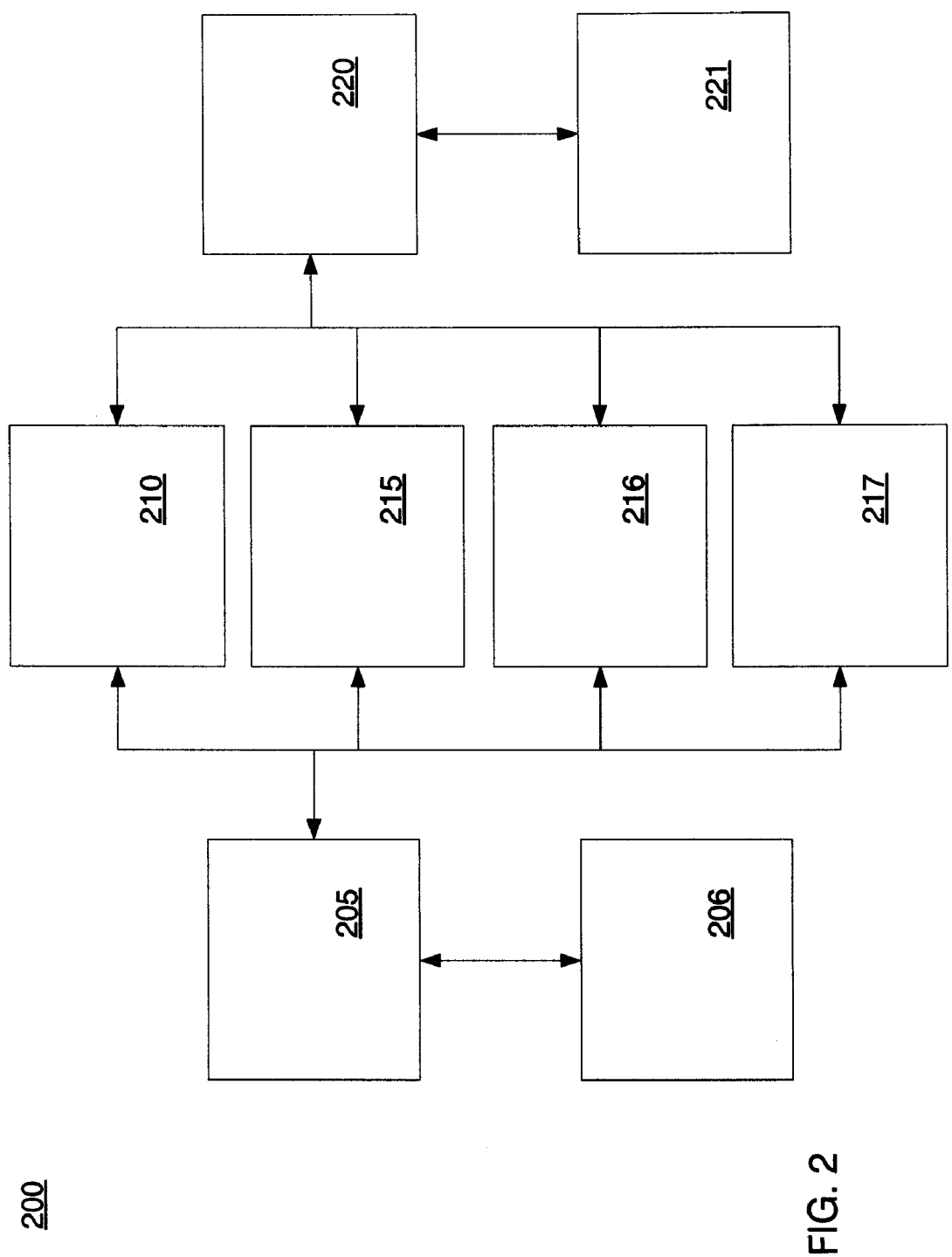
FIG. 2 is a block diagram of a publish/subscribe system providing high availability of an embodiment.

With reference to FIG. 2, there is shown an improved system (200) for providing high availability in a messaging system. In the examples described herein, the messaging system comprises a pub/sub system. However it should be understood that the messaging system can comprise any number of other systems.

The system (200) comprises a publisher (205) and an associated first application (206); a subscriber (220) and an associated second application (221). The publisher (205) and the subscriber (220) are operable to communicate with two or more of a first broker (210); a second broker (215); a third broker (216) and a fourth broker (217).

It should be understood that each of the brokers (210, 215, 216 and 217) is logically separate from another. Alternatively, one or more of the brokers are logically and physically separate from another.

Figure 3:
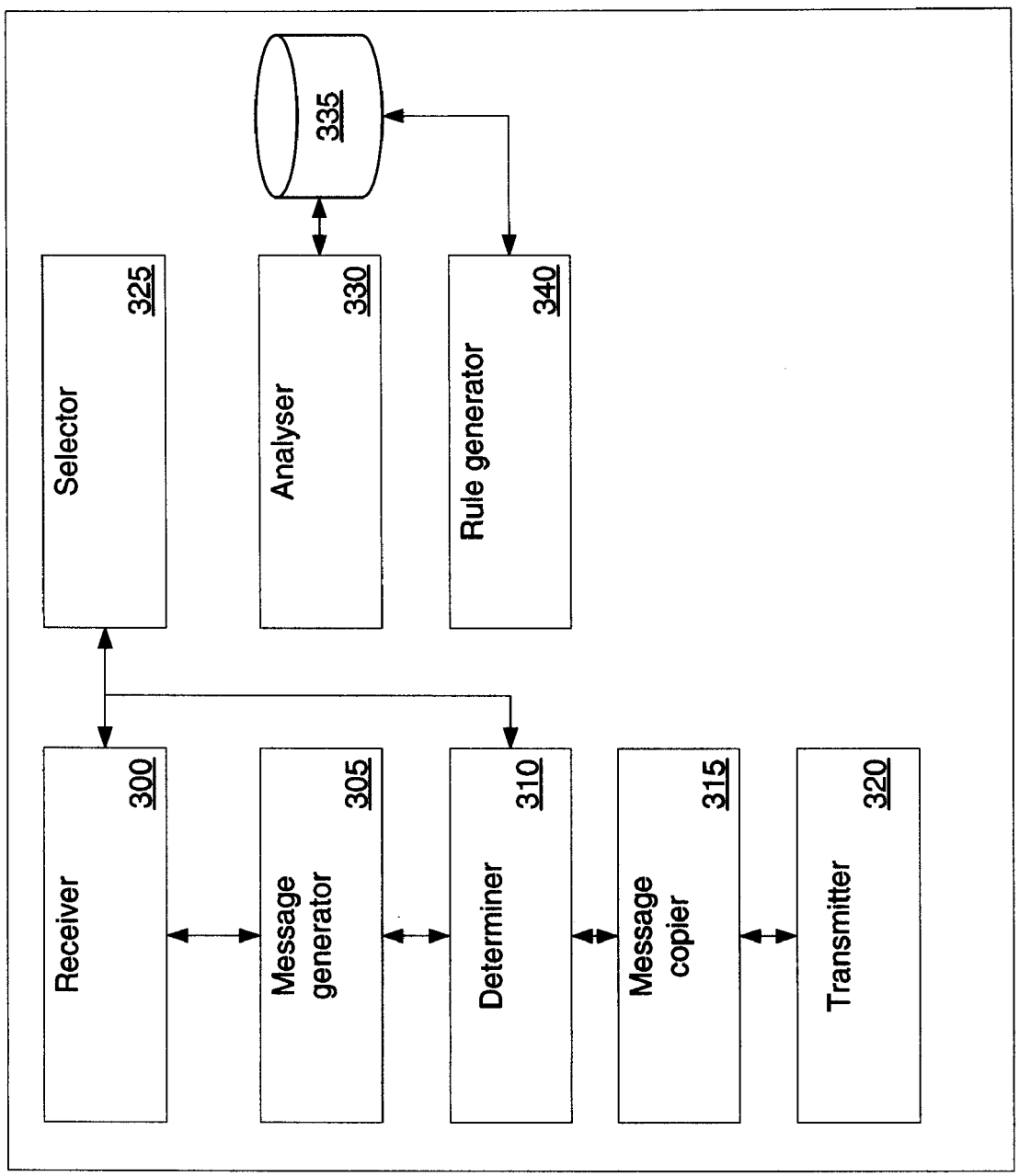
FIG. 3 is a block diagram of a publisher of the system of FIG. 2.

The publisher (205) is shown in more detail in FIG. 3 and comprises a first receiver (300), a message generator (305), a determiner (310), a message copier (315), a first transmitter (320), a selector (325), a first analyser (330) and having access to a first storage component (335); and a rule generator (340).

Figure 5:
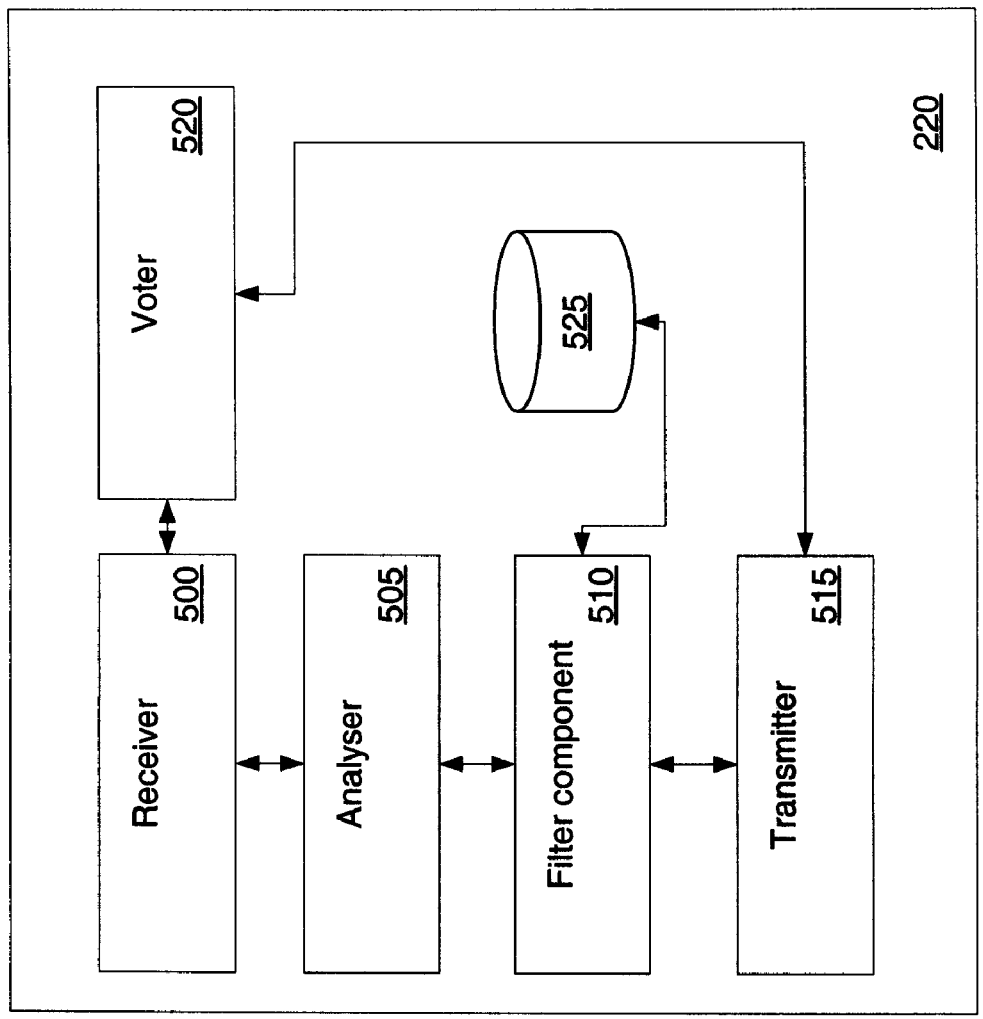
FIG. 5 is a block diagram of a subscriber of the system of FIG. 2.

The subscriber (220) is shown in more detail in FIG. 5 and comprises a second receiver (500), a second analyser (505), a filter component (510) having access to a second storage component (525), a second transmitter (515) and a voter (520).

A first example of a process of an embodiment will now be described with reference to the figures. In the first example, the publisher (205) and the subscriber (220) are operable to communicate with the first broker (210) and the second broker (215).

Figure 4A:
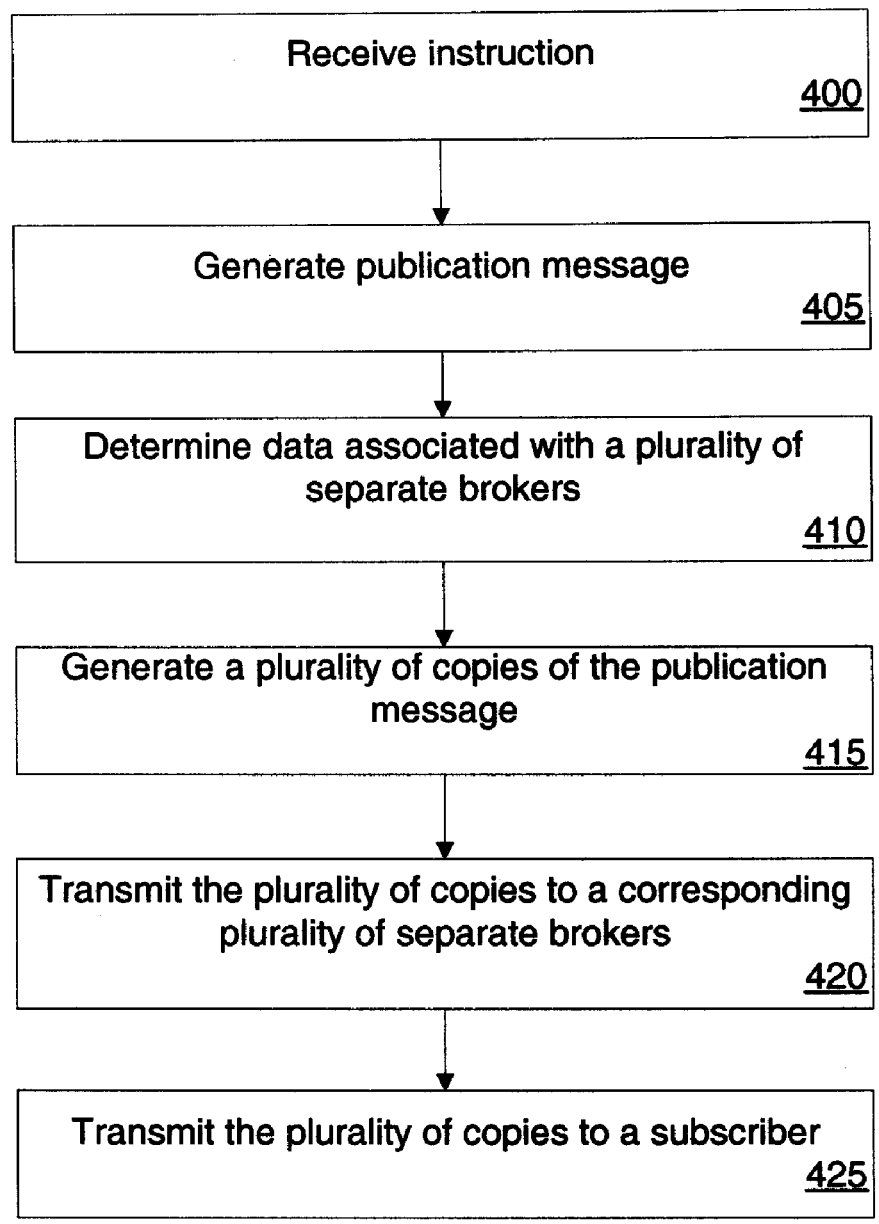
FIG. 4a is a flow chart showing the operational steps involved in a process associated with the publisher of FIG. 3.

With reference to FIG. 4a, at step 400, the first receiver (300) of the publisher (205) receives an instruction from the first application (206), wherein the instruction comprises data associated with a first publication message (e.g. a title, data content etc.). In response to receipt of the instruction, the message generator (305) generates (step 405) the first publication message.

The first publication message may comprise a publisher identifier (e.g. "P1"); a sequence identifier (e.g. "001") and an associated topic.

In one embodiment, a first sequence identifier generated by a publisher following a restart of the publisher does not overlap with a second sequence identifier generated by the publisher before the restart—this can be implemented for example, using techniques such as periodic check pointing; skipping a range of sequence identifier values at restart etc. Numerical values associated with the sequence identifiers may increase in a consecutive manner.

In response to generation of the first publication message, the determiner (310) determines (step 410) broker data associated with a plurality of brokers operable to communicate with the publisher (205). In the first example herein, the determiner (310) polls for connections that the publisher (205) has with a plurality of brokers and determines a value associated with a number of the connections. In the first example, the determiner (310) determines that the publisher (205) has two connections, namely, a first connection with the first broker (210) and a second connection with the second broker (215).

In response to determination of the broker data, the determiner (310) passes the broker data to the message copier (315). The message copier (315) uses the broker data to generate a plurality of copies of the first publication message. In the first example described herein, the message copier (315) uses the value (that is, "two") to determine how many copies of the first publication message should be generated. In response, the message copier (315) generates (step 415) two copies of the first publication message and passes the two copies to the first transmitter (320).

In response to receiving the two copies, the first transmitter (320) transmits (step 420) a first copy using the first connection to the first broker (210) and transmits a second copy using the second connection to the second broker (215).

The first broker (210) matches the topic associated with the first copy with a list of subscribers who have subscribed to receive messages that are published to that topic. In the first example herein, the first broker (210) determines a match and sends (step 425) the first copy to the matching subscriber (220). Likewise, the second broker (215) matches the topic associated with the second copy with a list of subscribers and in the first example herein, the second broker (215) determines a match and sends (step 425) the second copy to the matching subscriber (220).

In response to transmission of the first copy and the second copy, the second receiver (500) receives at least one of: the first copy and the second copy.

In the first example described herein, the second receiver (500) receives both the first copy and the second copy.

In the first example described herein, the second transmitter (515) transmits both the first copy and the second copy to the second application (221).

Advantageously, the subscriber (220) can still receive a copy of the original message even if one or more of the other copies are not received. Thus, this embodiment provides high availability without the need for a heartbeat mechanism or any other type of communication between a computer system comprising a broker and another standby computer system. Although a plurality of messages is transmitted across the network, the environment can comprise adequate bandwidth resources to deal with this.

A second example of a process will now be described with reference to the figures. In the second example, the publisher (205) and the subscriber (220) are operable to communicate with the first broker (210); the second broker (215); the third broker (216) and the fourth broker (217).

Figure 4B:
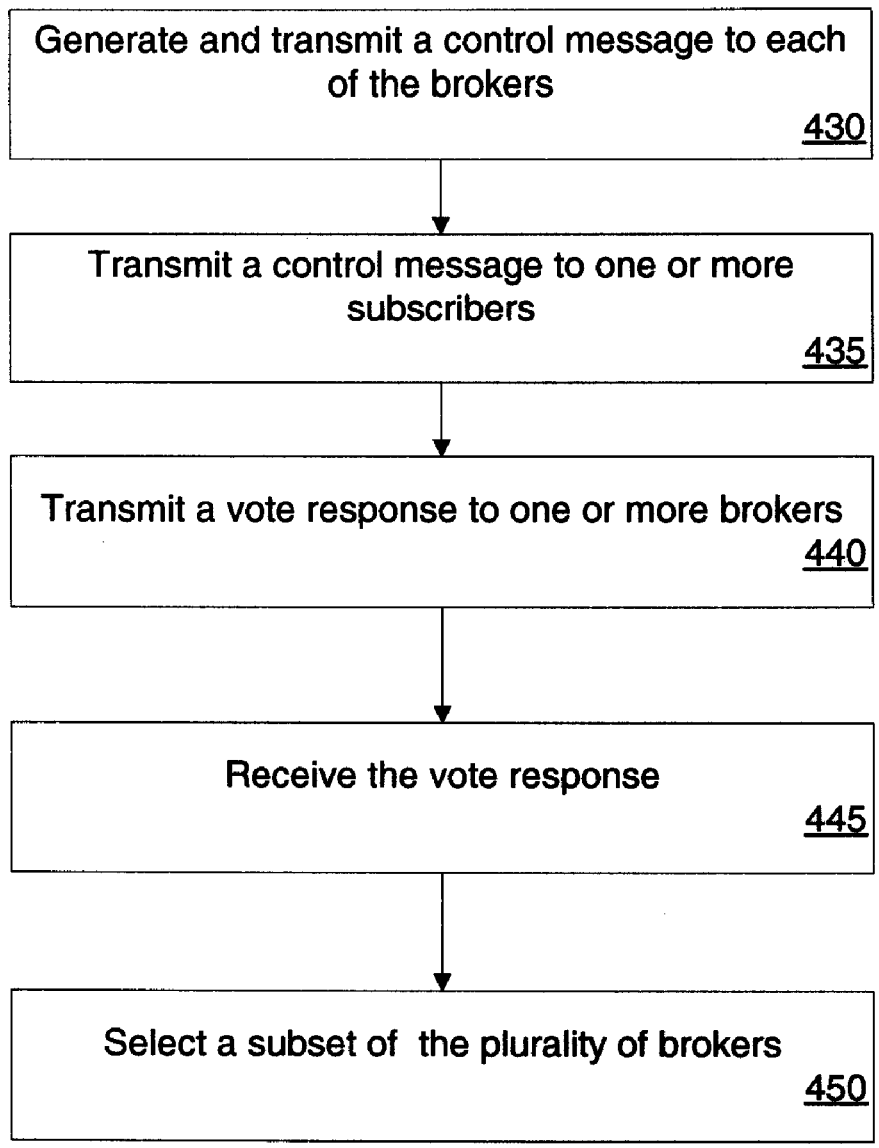
FIG. 4b is a flow chart showing the operational steps involved in a process associated with the publisher of FIG. 3.

With reference to FIG. 4b, at step 430, the message generator (305) generates a control message (e.g. comprising a control identifier for identifying the message as a control message (e.g. "CONTROL_1").

The control message may comprise an associated control topic (e.g. "CONTROL_1/feedback"). The publisher (205) also may subscribe to the control topic.

The first transmitter (320) transmits (step 430) a copy of the control message to each of the brokers that the publisher (205) has a connection with (that is, the first broker (210); the second broker (215); the third broker (216) and the fourth broker (217)).

At step 435, rather than matching the control topic against a list of subscribers, in response to receiving a control message (which a broker identifies by a control identifier), each broker is forced to send the control message to at least one of its associated subscribers. In the second example herein, each of the brokers sends an associated control message to the second receiver (500) of the subscriber (220). Alternatively, a control message can be sent to more than one subscriber.

In response to receiving a control message from a broker, the second analyser (505) generates a timestamp associated with the control message. The second analyser (505) associates the timestamp with the associated broker. In the second example, a first control message from the first broker (210) has an associated timestamp of 13:00:00; a second control message from the second broker (215) has an associated timestamp of 13:20:00; a third control message from the third broker (216) has an associated timestamp of 13:25:00 and a fourth control message from the fourth broker (217) has an associated timestamp of 13:26:00.

The second analyser (505) passes the timestamp data to the voter (520). The voter (520) uses the timestamp data to rank the brokers according to a pre-configurable parameter. In the second example herein, the voter (520) ranks the brokers according to a fastest time associated with receipt of a control message at the subscriber (220) (i.e. the voter (520) ranks the brokers in terms of ascending values of associated timestamps). As a result, the voter (520) ranks the first broker (210)

first, followed by the second broker (215), the third broker (216) and lastly, the fourth broker (217).

The voter (520) generates a vote response comprising ranking data. The ranking data can comprise broker identifiers associated with the highest ranking broker. In the second example, the vote response comprises ranking data associated with two of the most highly ranked brokers (i.e. the first broker (210) and the second broker (215)).

The second transmitter (515) transmits the vote response to at least one broker. In the second example herein, the second transmitter (515) transmits (step 440) the vote response to the first broker (210). Alternatively, the second transmitter (515) is operable to transmit the vote response to more than one broker.

In response to receiving the vote response, the first broker (210) matches the control topic with the publisher (205) who has subscribed to receive messages that are published to that topic. The first broker (210) sends (step 445) the vote response to the first receiver (300).

In response to receipt of the vote response, the selector (325) uses the vote response to select (step 450) a subset of the plurality of brokers operable to communicate with the publisher (205).

Optionally, the publisher (205) cancels its subscription to the control topic. Optionally, the publisher disconnects from one or more of the plurality of brokers.

In the second example, the selector (325) selects both of the brokers associated with the ranking data (that is, the first broker (210) and the second broker (215)). The selector (325) passes selection data associated with the selected brokers (e.g. identifier data associated with the selected brokers) to the determiner (310).

In response to the process of FIG. 4b, when the steps of FIG. 4a are executed, steps 400 and 405 are executed as described above. At step 410, the determiner (310) determines broker data associated with the brokers associated with the selection data e.g. a value associated with a number of brokers associated with the selection data. In the second example, the determiner (310) determines that the value is "two".

The message copier (315) uses the broker data to determine that two copies of the first publication message should be generated. The message copier (315) generates (step 415) two copies of the first publication message.

The first transmitter (320) uses broker identifiers associated with the selected brokers to transmit (step 420) a first copy using the first connection to the first broker (210) and a second copy using the second connection to the second broker (215).

As described above, each of the brokers matches the topic associated with the copy with a list of subscribers who have subscribed to receive messages that are published to that topic in order to send (step 425) the copy to a matching subscriber.

It should be understood that the difference in the time taken for a message to arrive from different brokers can be due to, for example: a broker residing in a different geographical location from another (e.g. wherein one broker is nearer in geographical terms to a subscriber than another); a broker having a different system configuration from another; a broker handling an increased workload than another; etc.

The process of FIG. 4b allows for a subscriber to "vote" for what it perceives to be the "fastest" brokers in terms of the time it takes for a (copy of a) message to arrive at the subscriber from the broker.

The publisher can subsequently use the vote response to select two or more brokers. Without the process of FIG. 4b, in the second example, four copies of the first publication message would be sent to four brokers. By using the process of FIG. 4b, as a subset of the four brokers can be selected, only two copies of the first publication message are sent and thus this reduces the overhead of bandwidth consumption.

Thus, although high availability is maintained, this process also provides for improved performance, workload balancing and resource optimisation.

As the process of FIG. 4b can be executed asynchronously with respect to the process of FIG. 4a, the process of FIG. 4b does not have an additional performance impact on the process of FIG. 4a. Thus, users will not be impacted by the process of FIG. 4b.

The process of FIG. 4b is repeatable according to a pre-configurable time threshold, such that optimisation can be provided on the basis of up to date vote responses. This allows for the selection of brokers to be changed if required (e.g. in order to change a previously selected broker because it is subsequently perceived to be slower or to change a previously selected broker because it has subsequently failed).

If more than one publisher is generating a control message, the transmission of the control messages from different publishers to the brokers is "staggered" such that a broker is not overloaded with multiple control messages at the same time. If a subscriber is to receive more than one control message, the transmission of the control messages from a broker(s) to the subscriber is also "staggered".

It should be understood that in an alternative to the process of FIG. 4b, the selector (325) can randomly select two or more brokers from a plurality of brokers operable to communicate with a publisher and can pass selection data associated with the randomly selected brokers to the determiner (310).

A third example of a process will now be described with reference to the figures. In the third example, the publisher (205) and the subscriber (220) are operable to communicate with the first broker (210); the second broker (215); the third broker (216) and the fourth broker (217).

Figure 4C:
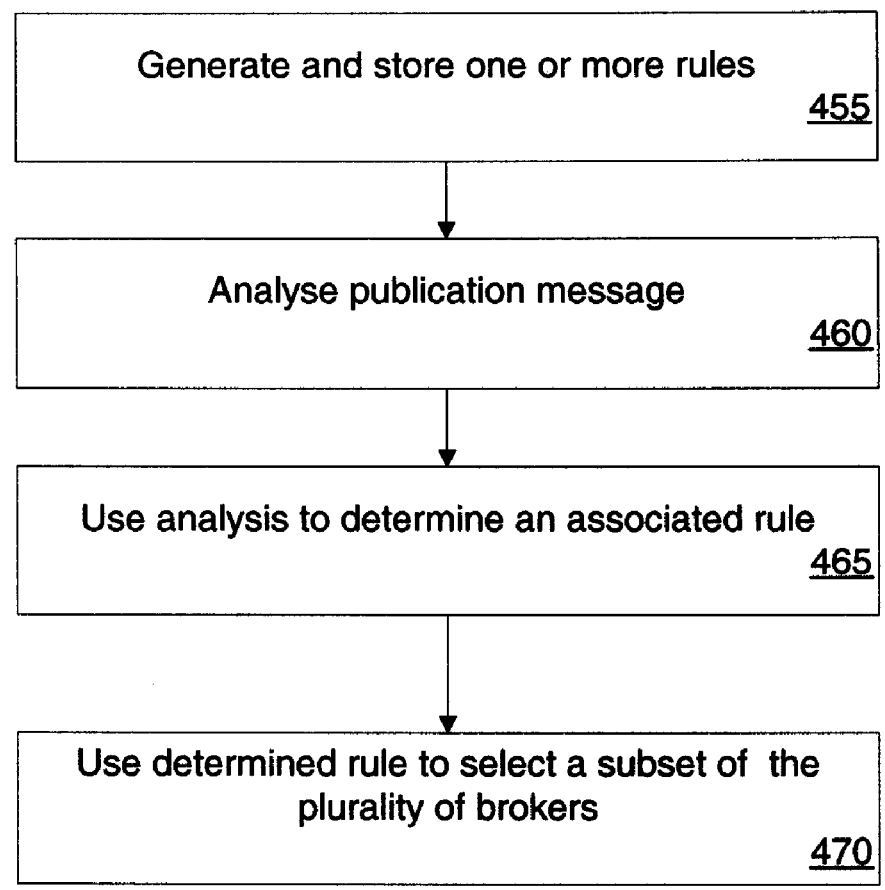
FIG. 4c is a flow chart showing the operational steps involved in a process associated with the publisher of FIG. 3.

With reference to FIG. 4c, in a pre-processing step (step 455), the rule generator (340) is operable to generate one or more rules comprising data associated with a publication message and data associated with selection of a subset of a plurality of brokers operable to communicate with the publisher (205).

The one or more rules may be pre-configurable. In one example, the rule generator (340) receives input from an administrator, a computer system etc. in order to generate a rule. In another example, the rule generator (340) uses historical statistics (e.g. time taken for a particular type of publication message to reach a subscriber from a broker) associated with the system (200) in order to generate a rule. The rule generator (340) may be operable to store (step 455) the one or more rules in the first storage component (335).

With reference to FIG. 4a, at step 400, the first receiver (300) of the publisher (205) receives an instruction from the first application (206), wherein the instruction comprises data associated with a first publication message (e.g. a title, data content etc.). In response to receipt of the instruction, the message generator (305) generates (step 405) the first publication message.

The first publication message can comprise a publisher identifier (e.g. "P1"); a sequence identifier (e.g. "001") and an associated topic. The first publication message also can comprise a header comprising a title (e.g. "My_music_1") and a size associated with data content (e.g. "3 MB") and a body comprising the data content (e.g. an audio file named my_music_1.wav).

At step 460, the first analyser (330) analyses the publication data, in an embodiment, according to pre-configurable criteria. In the third example herein, the first analyser (330) analyses the publication data in order to determine a size associated with data content of the first publication message (e.g. by parsing the header in order to obtain a value associated with a parameter comprising an associated identifier for identifying the parameter as specifying size associated with data content). In the third example herein, the associated value comprises "3 MB".

At step 465, the first analyser (330) uses the value and accesses the first storage component (335) to find a matching rule. Examples of a plurality of rules stored in the first storage component (335) are shown below:

Rule 1: if size=0 to 10 MB then select 3 brokers
Rule 2: if size=11 to 20 MB then select 2 brokers
Rule 3: if content=.wav or .mov then select 2 brokers
Rule 4: if content=.txt then select 4 brokers In the above rules, parameters associated with Rule 1 allow for relatively more bandwidth to be used (that is, because copies of a message are transmitted to a larger number of brokers) if a size of data content associated with a publication message is smaller than that allowed by parameters associated with Rule 2. This is because, typically, larger data content consumes more bandwidth than smaller data content.

In the above rules, parameters associated with Rule 3 allow for less bandwidth to be used (that is, because copies of a message are transmitted to a smaller number of brokers) if a type of data content comprises audio files (e.g. identified by a qualifier of ".wav") or video files (e.g. identified by a qualifier of ".mov") than parameters associated with Rule 4 specifying text files (e.g. identified by a qualifier of ".txt"). This is because typically, multimedia data content consumes more bandwidth than textual data content.

In response to step 465, the first analyser (330) finds a matching rule, namely, Rule 1. The first analyser (330) can pass Rule 1 to the selector (325).

The selector (325) can use (step 470) Rule 1 to select a subset of the plurality of brokers operable to communicate with the publisher (205).

In the third example herein, the selector (325) randomly selects three brokers in accordance with Rule 1 (e.g. the first broker (210), the second broker (215) and the third broker (216)). The selector (325) passes selection data associated with the selected brokers (e.g. identifier data associated with the selected brokers) to the determiner (310).

The remaining steps of FIG. 4a can then be executed, resulting in three copies of the first publication message being generated. A copy is transmitted to each of the three selected brokers.

The process of FIG. 4c can allow selection, at the point of publication, of a subset of the plurality of brokers operable to communicate with a publisher in accordance with one or more message characteristics (e.g. size of data content; type of the data content etc.).

Thus, although high availability is maintained, this process can provide for improved performance and resource optimisation by reducing the overhead of bandwidth consumption.

A fourth example of a process of an embodiment will now be described with reference to figures. In the fourth example, the publisher (205) and the subscriber (220) are operable to communicate with the first broker (210); the second broker (215); the third broker (216) and the fourth broker (217).

In the fourth example, each copy of a message received at the subscriber (220) is checked to determine whether for example, it is an out of order copy or a duplicate copy.

If a copy is determined as being an out of order copy or a duplicate copy, one or more corrective filter actions can be applied (e.g. the out of order copy or the duplicate copy is discarded).

The fourth example can be used with an application that can tolerate message loss.

With reference to FIG. 4a, at step 400, the first receiver (300) of the publisher (205) receives an instruction from the first application (206), wherein the instruction comprises data associated with a plurality of publication messages, namely a first publication message, a second publication message, a third publication message and a fourth publication message.

In response to receipt of the instruction, the message generator (305) generates (step 405) the first publication message, the second publication message, the third publication message and the fourth publication message.

Each publication message can comprise a publisher identifier (e.g. "P1"); a sequence identifier (e.g. "001"; "002"; "003" and "004" respectively) and an associated topic.

The selector (325) selects (e.g. using the process of FIG. 4b or FIG. 4c) a subset of a plurality of brokers operable to communicate with the publisher (205).

In the example herein, the selector (325) selects the first broker (210) and the second broker (215) to which the first publication message and the second publication message should be transmitted and selects the third broker (216) and the fourth broker (217) to which the third publication message and the fourth publication message should be transmitted.

The selector (325) passes selection data associated with the selected brokers (e.g. broker identifiers associated with the selected brokers) to the determiner (310). The selector (325) also can pass to the determiner (310), sequence identifiers associated with each of the copies to be transmitted to each selected broker.

For each message, the determiner (310) uses the selection data to determine broker data comprising a value associated with a number of selected brokers.

The message copier (315) uses the broker data to generate two copies of each of the publication messages. The message copier (315) passes each of the copies and broker identifiers associated with the selected brokers for each copy to the first transmitter (320).

The first transmitter (320) uses the broker identifiers to transmit a first copy of the first publication message and a first copy of the second publication message to the first broker (210); a second copy of the first publication message and a second copy of the second publication message to the second broker (215); a first copy of the third publication message and a first copy of the fourth publication message to the third broker (216) and a second copy of the third publication message and a second copy of the fourth publication message to the fourth broker (217).

In the example herein, each of the brokers receives each of its associated copies and each of the brokers transmits its associated copies to the subscriber (220).

Figure 6A:
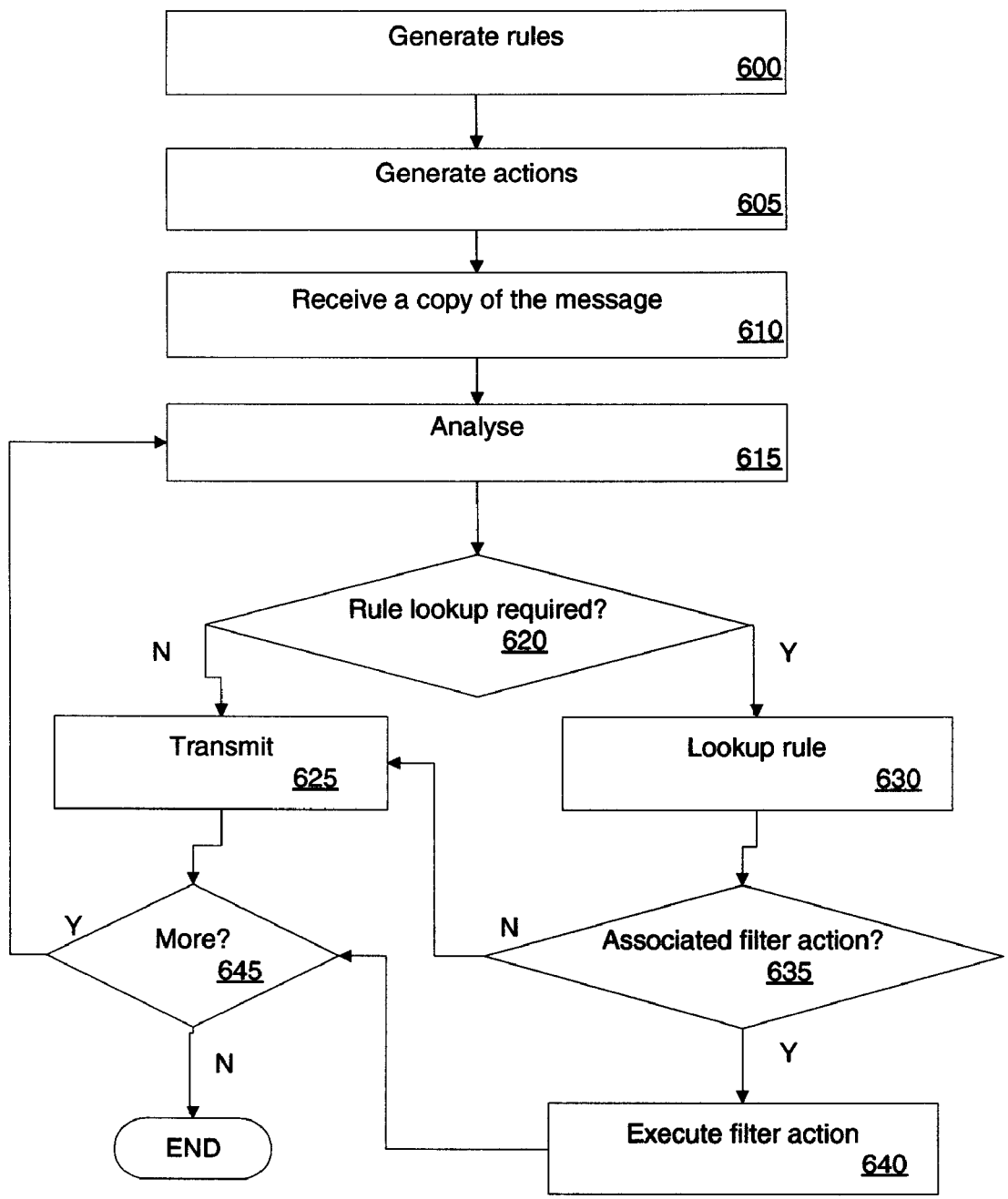
FIG. 6a is a flow chart showing the operational steps involved in a process associated with the subscriber of FIG. 5.

With reference to FIG. 6a, in a pre-processing step 600, the filter component (510) is operable to generate one or more filter rules comprising data associated with identifying an out of order copy and a duplicate copy. In an embodiment, the filter component (510) is operable to store the one or more filter rules in the second storage component (525).

In a pre-processing step 605, the filter component (510) is operable to generate one or more filter actions executable in response to identification of an out of order copy or a duplicate copy. In an embodiment, the filter component (510) is operable to store the one or more filter actions in the second storage component (525).

At least one of a filter rule and a filter action can be generated in response to receipt of input from an administrator, a computer system; etc. In another example, at least one of a filter rule and a filter action are generated in response to analysis of historical statistics associated with the system (200).

In the fourth example herein, the second receiver (500) receives (step 610) the copies in the following order, wherein a sequence identifier comprises a three digit number and an associated raised number indicates a copy number:

"001$^1$"; "003$^1$"; "003$^2$"; "004$^2$"; "002$^1$"; "001$^2$"; and "002$^2$".

At step 615, the second analyser (505) analyses the first copy of the first publication message in order to determine a publisher identifier (e.g. "P1") and a sequence identifier (e.g. "001").

The analyser passes the publisher identifier and the sequence identifier to the filter component (510).

At step 620, the filter component (510) checks the publisher identifier against memory in order to determine whether a copy of a message has previously been received from the associated publisher. As the first copy of the first publication message is the first copy to be received from the publisher (205), the memory is empty and the filter component (510) determines that a copy of a message has not previously been received from the publisher (205).

At step 620, the filter component (510) determines that the first copy of the first publication message cannot be an out of order copy or a duplicate copy and determines that a rule lookup is not required.

The filter component (510) passes the first copy of the first publication message to the second transmitter (515), which transmits (step 625) the first copy of the first publication message to the second application (221).

The second transmitter (515) is operable to store the publisher identifier (e.g. "P1") and the sequence identifier associated with the most recently transmitted copy (e.g. "001") in memory.

At step 645, the second analyser (505) determines whether there is a further copy to be processed. The second analyser (505) determines that there is a further copy to be processed and at step 615, the second analyser (505) analyses the first copy of the third publication message in order to determine a publisher identifier (e.g. "P1") and a sequence identifier (e.g. "003").

The analyser passes the publisher identifier and the sequence identifier to the filter component (510).

At step 620, the filter component (510) checks the publisher identifier (e.g. "P1") against the publisher identifier stored in memory (e.g. "P1") and determines that a copy of a message has previously been received from the publisher (205).

At step 620, the filter component (510) determines that the first copy of the third publication message could thus be an out of order copy or a duplicate copy and determines that a rule lookup is required.

At step 630, the filter component (510) checks the sequence identifier of the first copy of the third publication message (namely, "003") against the sequence identifier stored in memory (namely, "001") and against one or more filter rules. Examples of filter rules are shown below:

Rule 5: If (seq_id_current)>(seq_id_stored) then not out of order or duplicate

Rule 6: If (seq_id_current)<or=(seq_id_stored) then out of order or duplicate respectively; execute=filter_action_1

In the fourth example, the filter component (510) determines in accordance with rule 5 that as a numerical value of the sequence identifier "003" is higher than a numerical value of the sequence identifier stored in memory (namely, "001"), the first copy of the third publication message is not out of order or a duplicate.

It should be understood that in accordance with rule 6, if a numerical value of the sequence identifier of a copy is lower than or equal to a numerical value of the sequence identifier stored in memory, the copy is identified as being out of order or a duplicate respectively.

The filter component (510) uses rule 5 to determine (step 635) that there is no associated filter action and passes the first copy of the third publication message to the second transmitter (515) which transmits (step 625) the first copy of the third publication message to the second application (221).

The second transmitter (515) is operable to replace the previously stored publisher identifier (e.g. "P1") and sequence identifier (e.g. "001") in memory with the publisher identifier (e.g. "P1") and sequence identifier (e.g. "003") of the most recently transmitted copy.

At step 645, the second analyser (505) determines whether there is a further copy to be processed. The second analyser (505) and determines that there is a further copy to be processed and at step 615, the second analyser (505) analyses the second copy of the third publication message in order to determine a publisher identifier (e.g. "P1") and a sequence identifier (e.g. "003").

The analyser passes the publisher identifier and the sequence identifier to the filter component (510).

At step 620, the filter component (510) checks the publisher identifier (e.g. "P1") against the publisher identifier stored in memory (e.g. "P1") and determines that a copy of a message has previously been received from the associated publisher.

At step 620, the filter component (510) determines that the second copy of the third publication message could thus be an out of order copy or a duplicate copy and determines that a rule lookup is required.

At step 630, the filter component (510) checks the sequence identifier of the second copy of the third publication message (namely, "003") against the sequence identifier stored in memory (namely, "003") and against the one or more filter rules.

In the fourth example, the filter component (510) determines in accordance with rule 6 that as a numerical value of the sequence identifier "003" is equal to a numerical value of the sequence identifier stored in memory (namely, "003"), the second copy of the third publication message is a duplicate.

The filter component (510) uses rule 6 to determine (step 635) an associated filter action (e.g. filter_action_1). The filter component (510) accesses the second storage component (525) to obtain the filter action. An example of the filter action is shown below:

Filter_action_1: Discard

At step 640, the filter component (510) executes the filter action by discarding the second copy of the third publication message.

Therefore, the second copy of the third publication message is not transmitted to the second application (221) and the memory is not updated.

The above process is repeated for the remainder of the received copies. Data associated with the outcome of processing of each received copy is shown below in Table 1:

TABLE 1

| Sequence identifier | Outcome |
|---|---|
| "004" | As a numerical value of the sequence identifier (e.g. "004") is more than a numerical value of the sequence identifier stored in memory (e.g. "003"), the copy is not out of order or a duplicate and is transmitted to the application. The memory is updated with the publisher identifier (e.g. "P1") and the sequence identifier (e.g. "004"). |
| "002" | As a numerical value of the sequence identifier (e.g. "002") is less than a numerical value of the sequence identifier stored in memory (e.g. "004"), the copy is out of order. The copy is discarded and the memory is not updated. |
| "001" | As a numerical value of the sequence identifier (e.g. "001") is less than a numerical value of the sequence identifier stored in memory (e.g. "004"), the copy is out of order. The copy is discarded and the memory is not updated. |
| "004" | As a numerical value of the sequence identifier (e.g. "004") is equal to a numerical value of the sequence identifier stored in memory (e.g. "004"), the copy is a duplicate. The copy is discarded and the memory is not updated. |
| "002" | As a numerical value of the sequence identifier (e.g. "002") is less than a numerical value of the sequence identifier stored in memory (e.g. "004"), the copy is out of order. The copy is discarded and the memory is not updated. |

Thus, the second application (221) receives a copy of the first publication message, the third publication message and the fourth publication message. The second application (221) does not receive a copy of the second publication message.

This process can allow for filtering to occur at the subscriber such that an application can receive only the most recent information, for example, by the filtering out of outdated content (e.g. the first copy of the second publication message which is identified as an out of order copy and is identified as having associated outdated content because the numerical value of the sequence identifier is less than the numerical value of the sequence identifier of the most recently transmitted copy) and redundant content (e.g. the second copy of the third publication message which is identified as having associated redundant content because the numerical value of the sequence identifier is equal to the numerical value of the sequence identifier of the most recently transmitted copy).

For example, an application handling stock prices can provide users with only the most recent stock prices.

The filtering logic at the subscriber further can allow for a lack of inter-broker communication.

The filter component (510) can be made aware of a format associated with a particular range of sequence identifiers of a publisher in a pre-processing step. Alternatively, format data is sent with a copy of a publication message from a publisher.

In an embodiment, the process is not used with an application that cannot tolerate message loss (for example, because in the fourth example, the second application (221) does not receive a copy of the second publication message—it is effectively "lost").

A fifth example of a process will now be described with reference to figures. In the fifth example, the publisher (205) and the subscriber (220) are operable to communicate with the first broker (210) and the second broker (215).

With reference to FIG. 4a, at step 400, the first receiver (300) of the publisher (205) receives an instruction from the first application (206) comprising data associated with a first publication message, a second publication message, a third publication message and a fourth publication message.

In response to receipt of the instruction, the message generator (305) generates (step 405) the first publication message, the second publication message, the third publication message and the fourth publication message each publication message comprises a publisher identifier (e.g. "P1"); a sequence identifier (e.g. "001"; "002"; "003" and "004" respectively) and an associated topic.

The remaining steps of FIG. 4a can then be executed, resulting in a copy of each of the publication messages being transmitted to each of the first broker (210) and the second broker (215).

Figure 6B:
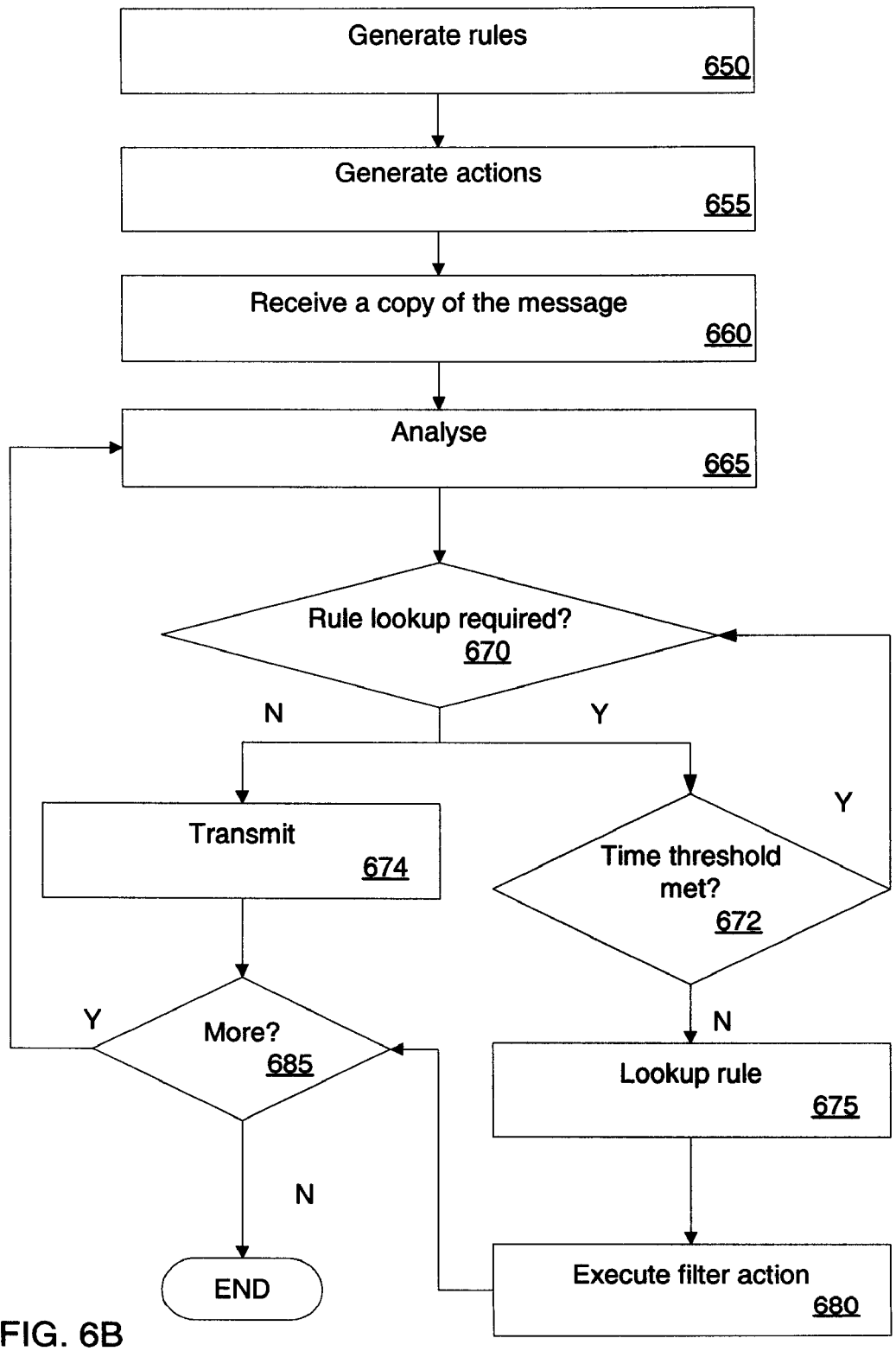
FIG. 6b is a flow chart showing the operational steps involved in a process associated with the subscriber of FIG. 5.

With reference to FIG. 6b, in a pre-processing step 650, the filter component (510) is operable to generate one or more filter rules comprising data associated with identifying a gap in sequence identifiers of a particular sequence. The filter component (510) can be operable to store the one or more filter rules in the second storage component (525).

In a pre-processing step 655, the filter component (510) is operable to generate one or more filter actions. The filter component (510) can be operable to store the one or more filter actions in the second storage component (525).

The filter component (510) can be made aware of a format associated with a particular range of sequence identifiers of a publisher in a pre-processing step. Alternatively, format data is sent with a copy of a publication message from a publisher.

In the fifth example herein, the second receiver (500) receives (step 660) a first copy of the first publication message from the first broker (210).

At step 665, the second analyser (505) analyses the first copy of the first publication message in order to determine a publisher identifier (e.g. "P1") and a sequence identifier (e.g. "001").

The analyser passes the publisher identifier and the sequence identifier to the filter component (510).

At step 670, the filter component (510) checks the publisher identifier against memory in order to determine whether a copy of a message has previously been received from the associated publisher. As the first copy of the first publication message is the first copy to be received from the publisher (205), the memory is empty and the filter component (510) determines that a copy of a message has not previously been received from the publisher (205).

At step 670, the filter component (510) determines that a gap cannot exist if the first copy of the first publication message is a first copy received from the publisher (205) and thus, a rule lookup is not required.

The filter component (510) passes the first copy of the first publication message to the second transmitter (515), which transmits (step 674) the first copy of the first publication message to the second application (221).

The second transmitter (515) is operable to store the publisher identifier (e.g. "P1" is stored against a "publisher identification" entry) and the sequence identifier associated with the most recently transmitted copy (e.g. "001" is stored against a "last sequence identifier received" entry) in memory as shown in Table 2 in FIG. 7.

At step 685, the second analyser (505) determines whether there is a further copy to be processed. The second analyser (505) determines that there is a further copy to be processed and at step 665, the second analyser (505) analyses a first copy of the third publication message from the first broker (210) in order to determine a publisher identifier (e.g. "P1") and a sequence identifier (e.g. "003").

The analyser passes the publisher identifier and the sequence identifier to the filter component (510).

At step 670, the filter component (510) checks the sequence identifier of the first copy of the third publication message (namely, "003") against the sequence identifier stored in memory (namely, "001") (e.g. table 2) and determines that a copy of a message has previously been received from the publisher and thus a rule lookup (in order to detect whether a gap in sequence identifiers exists) is required.

In a first sub-example, the filter component (510) determines that a pre-configurable time threshold has not passed (step 672) and at step 675, the filter component (510) checks the sequence identifiers (e.g. "003" and "001") against one or more filter rules. Examples of filter rules are shown below:

Rule 7: If (seq_id_current)<=(last_sequence_id_received) then execute filter_action_a Rule 8: If (seq_id_current)=1+(last_sequence_id_received) then execute filter_action_b Rule 9: If (seq_id_current) not>any (last_sequence_id_from_broker_"n") and if (broker "n"=solely available or all other brokers have gap detected indicator) then execute filter_action_b Rule 10: If (seq_id_current)>1+(last_sequence_id_received) then execute filter_action_c In first sub-example, the filter component (510) determines in accordance with rule 10 that as a numerical value of the sequence identifier "003" is 2 summed with a numerical value of the sequence identifier stored in memory (namely, "001"), an associated filter action (e.g. filter_action_c) should be executed.

The filter component (510) accesses the second storage component (525) to obtain the filter action. An example of the filter action is shown below:

Filter_action_c:
Complete "Gap detected by Broker "n"" entry;
Store sequence identifier against "Last sequence identifier from Broker "n"";
Discard copy;
Request Broker "n" to resend later At step 680, the filter component (510) executes the filter action by completing the entry for "Gap detected by Broker "1"" and storing the sequence identifier "003" against a column in the table, namely, "Last sequence identifier from Broker "1" (the updated table is shown in table 3 of FIG. 7). The filter component (510) also discards the first copy of the third publication message and sends the first broker (210) a request to send the first copy of the third publication message at a later (pre-configurable) time. The latter sub-action allows for other brokers (e.g. the second broker (215)) to "fill in" the gap by sending the required message (e.g. the second publication message).

Alternatively, the first copy of the third publication message can be held in storage until the second publication message is sent. However, this may cause overheads on storage at the subscriber (220).

If there are no further copies (step 685), the process ends, otherwise, the next copy is analysed at step 665.

In a second sub-example, the filter component (510) determines that a pre-configurable time threshold has passed (step 672) and re-checks (step 670) the sequence identifier of the first copy of the third publication message (namely, "003") against a sequence identifier stored in memory. In the second sub-example, herein, status associated with memory is shown in table 4, wherein the last sequence identifier received comprises "003". This is due to the second broker (215) sending a second copy of the second publication message and a second copy of the third publication message to the subscriber (220) during the pre-configurable time threshold.

In the second sub-example, the filter component (510) determines that a pre-configurable time threshold has not passed (step 672) and at step 675, the filter component (510) uses the sequence identifiers (e.g. "003" and "003") to check them against the one or more filter rules.

The filter component (510) determines in accordance with rule 7 that as a numerical value of the sequence identifier "003" is equal to a numerical value of the sequence identifier stored in memory (namely, "003"), an associated filter action (e.g. filter_action_a) should be executed.

The filter component (510) accesses the second storage component (525) to obtain the filter action. An example of the filter action is shown below:

Filter_action_a:
Discard the message;
Clear "Gap detected by Broker "n"" entry
Clear "Last sequence identifier from Broker "n" entry At step 680, the filter component (510) executes the filter action by discarding the first copy of the third publication message and clearing the entries associated with the fields "Gap detected by Broker "1"" and "Last sequence identifier from Broker "1""

This is because the "gap" has already been filled by the second broker (215) (which sent a second copy of the second publication message and a second copy of the third publication message to the subscriber (220) during the pre-configurable time threshold).

In a third sub-example, the filter component (510) determines that a pre-configurable time threshold has passed (step 672) and re-checks (step 670) the sequence identifier of the first copy of the third publication message (namely, "003") against a sequence identifier stored in memory. In the third sub-example, herein, status associated with memory is shown in table 5, wherein the last sequence identifier received comprises "004". This is due to the second broker (215) sending a second copy of the second publication message, a second copy of the third publication message and a second copy of the fourth publication message to the subscriber (220) during the pre-configurable time threshold.

In the third sub-example, the filter component (510) determines that a pre-configurable time threshold has not passed (step 672) and at step 675, the filter component (510) checks the sequence identifiers (e.g. "004" and "003") against the one or more filter rules.

The filter component (510) determines in accordance with rule 7 that as a numerical value of the sequence identifier "003" is less than a numerical value of the sequence identifier stored in memory (namely, "004"), an associated filter action (e.g. filter_action_a) should be executed.

At step 680, the filter component (510) executes the filter action as described above, because the "gap" has already been filled by the second broker (215).

In a fourth sub-example, the filter component (510) determines that a pre-configurable time threshold has passed (step 672) and re-checks (step 670) the sequence identifier of the first copy of the third publication message (namely, "003") against a sequence identifier stored in memory. In the fourth sub-example, herein, status associated with memory is shown in table 6, wherein the last sequence identifier received comprises "002". This is due to the second broker (215) sending a second copy of the second publication message to the subscriber (220) during the pre-configurable time threshold.

In the fourth sub-example, the filter component (510) determines that a pre-configurable time threshold has not passed (step 672) and at step 675, the filter component (510) checks the sequence identifiers (e.g. "002" and "003") against the one or more filter rules.

The filter component (510) determines in accordance with rule 8 that as a numerical value of the sequence identifier "003" is 1 summed with a numerical value of the sequence identifier stored in memory (namely, "002"), an associated filter action (e.g. filter_action_b) should be executed.

The filter component (510) accesses the second storage component (525) to obtain the filter action. An example of the filter action is shown below:

Filter_action_b:
Transmit copy to the application
Store sequence identifier in entry "Last sequence identifier received"
Clear "Gap detected by Broker "n"" entry
Clear "Last sequence identifier from Broker "n" entry At step 680, the filter component (510) executes the filter action by passing the first copy of the third publication message to the second transmitter (515) so that it can be transmitted to the second application (221), storing the sequence identifier "003" against "Last sequence identifier received" and clearing the entries associated with the fields "Gap detected by Broker "1"" and "Last sequence identifier from Broker "1""

This is because the "gap" has already been filled by the second broker (215).

In a fifth sub-example, the filter component (510) determines that a pre-configurable time threshold has passed (step 672) and re-checks (step 670) the sequence identifier of the first copy of the third publication message (namely, "003") against a sequence identifier stored in memory. In the fifth sub-example, herein, status associated with memory is shown in table 7 wherein the last sequence identifier received comprises "001", and entries associated with "Gap detected by Broker "2"" entry and "Last sequence identifier from Broker "2" (e.g. "003") have been completed.

In the fifth sub-example, the filter component (510) determines that a pre-configurable time threshold has not passed (step 672) and at step 675, the filter component (510) checks the sequence identifiers against the one or more filter rules.

The filter component (510) determines in accordance with rule 9 that as a numerical value of the sequence identifier "003" is not more than a numerical value of a last sequence identifier from the second broker (215) and that all other brokers (e.g. the second broker (215)) have an associated entry for "Gap detected by Broker "n"", an associated filter action (e.g. filter_action_b) should be executed.

At step 680, the filter component (510) executes the filter action as described above.

It should be understood that in the fifth sub-example, all copies of the second publication message have been lost. Thus the second application (221) receives a copy of the first publication message and the third publication message. It should be understood that rule 10 is also executable in response to the first broker (210) being the only available broker, as in this case, all copies of the second publication message are also lost as there are no other brokers available to fill in the gap.

Alternatively, if such an error is detected, any number of other mechanisms can be executed, e.g. an alert is generated and sent to the first application (206) such that further copies of the second publication message are generated and sent.

This embodiment can be used in a number of applications. In one application, this embodiment can be used in digital data transmission systems. For example, in a digital television system, a set-top box can be operable to receive data from more than one transmitter. At set-up time, the set-top box can detect data from the plurality of transmitters and decide (at set-up time) which transmitter to use e.g. based on the quality of the data. Once the set-top box has chosen a transmitter, it is not possible for another transmitter to be used. This is frustrating for an end user if reception from the chosen transmitter is subsequently poor.

In an example of the application, digital data packets (e.g. comprising video and audio data) associated with a channel are transmitted by a packet generator to at least two transmitters. It should be understood that each transmitter may encode the packets using a different format from the other.

In an embodiment, a set-top box tunes into and receives packets from the at least two transmitters at set up time. In an embodiment, the set-top box is operable to discard duplicate packets and to display a stream of packets.

Thus, if one or more packets were lost from one of the transmitters, the set-top box is operable to receive packets from the other and thus, the end user is still able to view the channel. Thus, use of this embodiment improves availability and reliability of data transmission.

It should be understood that this embodiment can be used with any number of other digital data transmission systems (e.g. digital radio systems).

In another application, an embodiment can be used in voice over internet protocol (VoIP) systems. Typically, when voice packets are lost in transmission, the end user experiences for example, gaps in a voice conversation.

In a first example of the application, voice packets are transmitted by a packet generator to at least two voice packet transmitters. In an embodiment, additional filtering is required within a transmitter, such that packets are delivered with minimal time delay and in sequence. The system described in the first example is adequate for subscribers that can cope with delays which may occur.

In a second example of the application, in a system wherein a subscriber cannot cope with delays, a transmitter (or alternatively, a subscriber) can comprise a module which provides linear predictive coding. Alternatively, any number of other encoding and synthesis techniques can be used.

When a transmitter detects loss of a packet or a delay (e.g. in response to analysis of sequence identifiers of packets), the module "predicts" the next packet in the sequence (e.g. by using historical statistics associated with previous sequences). In an embodiment, the module generates the predicted next packet, which is transmitted to the subscriber.

In time, the quality of the predicted packets may begin to degrade, thus, when the transmitter detects another generated packet in the sequence, subsequent to detecting a loss of a packet or a delay, the module may be interrupted, such that the generated packet is transmitted and quality associated with the voice packets is regained.

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In an alternative, the preferred embodiment of the present invention may be realized in the form of computer implemented method of deploying a service comprising steps of deploying computer program code operable to, when deployed into a computer infrastructure and executed thereon, cause said computer system to perform all the steps of the described method.

It will be clear to one skilled in the art that many improvements and modifications can be made to the foregoing exemplary embodiment without departing from the scope of the present invention.

The invention claimed is:

1. An apparatus for high availability message transmission, comprising:
   a determiner, at a message publisher, configured to determine at least two of a plurality of message transmitters to use for transmitting a first message from the message publisher to a subscriber;
   a message copier, at the message publisher, configured to create, for each determined message transmitter, a copy of the first message, each copy having a distinct copy number; and
   a transmitter, at the message publisher, configured to transmit, to each determined message transmitter, a distinct one of the created copies of the first message for subsequent transmission of the distinct transmitted copy from the determined message transmitter to the subscriber, the distinct copy number of the distinct transmitted copy usable by the subscriber for detecting duplicate copies of the first message, wherein:
   the determiner accesses, for determining the at least two of the plurality of message transmitters to use, a selector configured to select the at least two of the plurality of message transmitters; and
   the selector is configured to select the at least two of the plurality of message transmitters using voting, the voting comprising transmission of a control identifier from each of the plurality of message transmitters to the subscriber and receipt, at the selector, of a control response created by the subscriber using the control identifier transmitted from each of the plurality of message transmitters.

2. The apparatus as claimed in claim 1, wherein the control response comprises a ranking of the plurality of message transmitters.

3. The apparatus as claimed in claim 1, wherein the selector is configured to select the at least two message transmitters in response to an analyser configured to analyse the first message and to determine an associated rule that identifies the at least two of the plurality of message transmitters to use.

4. The apparatus as claimed in claim 3, wherein the rule is associated with at least one of a size of the first message and a content type associated with the first message.

5. The apparatus as claimed in claim 3, wherein a second analyser is configured to analyse, at the subscriber, the distinct copy number in each received copy of the first message to detect whether a particular one of the received copies is a duplicate copy.

6. The apparatus as claimed in claim 5, further comprising a filter component configured to execute a filter action for handling the duplicate copy in response to the second analyser detecting that the particular one of the copies is the duplicate copy.

7. The apparatus as claimed in claim 6, wherein the filter action comprises discarding the duplicate copy.

8. A method for high availability message transmission, comprising:
   determining, at a message publisher, at least two of a plurality of message transmitters to use for transmitting a first message from the message publisher to a subscriber, wherein the determining uses voting, the voting comprising transmission of a control identifier from each of the plurality of message transmitters to the subscriber and receipt, at the message publisher, of a control response created by the subscriber using the control identifier transmitted from each of the plurality of message transmitters;
   creating, at the message publisher for each determined message transmitter, a copy of the first message, each copy having a distinct copy number; and
   transmitting, from the message publisher to each determined message transmitter, a distinct one of the created copies of the first message for subsequent transmission of the distinct transmitted copy from the determined message transmitter to the subscriber, the distinct copy number of the distinct transmitted copy usable by the subscriber for detecting duplicate copies of the first message.

9. The method as claimed in claim 8, wherein the control response comprises a ranking of the plurality of message transmitters.

10. The method as claimed in claim 8, wherein determining the at least two of the plurality of message transmitters further comprises:
- analyzing the first message; and
- determining an associated rule that identifies the at least two of the plurality of message transmitters to use.

11. The method as claimed in claim 10, wherein the rule is associated with at least one of: size of the first message and content type associated with the first message.

12. The method as claimed in claim 10, further comprising:
- analysing, at the subscriber, the distinct copy number in each received copy of the first message to detect whether a particular one of the received copies is a duplicate copy.

13. The method as claimed in claim 12, further comprising:
- executing, in response to detecting, at the subscriber, that the particular one of the received copies is the duplicate copy, a filter action for handling the duplicate copy.

14. The method as claimed in claim 13, wherein the filter action comprises discarding the duplicate copy.

15. The method as claimed in claim 8, wherein:
- the determining determines the at least two of the plurality of message transmitters to use for transmitting, from the message publisher, each message in a message sequence, the message sequence comprising at least three messages;
- the creating creates, for each determined message transmitter, a copy of each of the messages in the message sequence, wherein:
  - each message in the message sequence has a distinct message sequence identifier associated therewith that identifies an order of the message within the message sequence;
  - the copy of each message includes the distinct message sequence identifier of the message; and
  - each copy has the distinct copy number;
- the transmitting transmits, to each determined message transmitter, a distinct one of the created copies of each of the messages in the message sequence for subsequent transmission of the distinct transmitted copy from the determined message transmitter to the subscriber, the distinct message sequence identifier of the distinct transmitted copy usable by the subscriber for detecting out-of-order copies and the distinct copy number of the distinct transmitted copy usable by the subscriber for detecting duplicate copies of the messages in the message sequence.

16. The method as claimed in claim 15, further comprising:
- analyzing, at the subscriber, the distinct message sequence identifier in each received copy of each of the messages in the message sequence to detect whether a particular one of the received copies is an out-of-order copy; and
- executing, in response to detecting, at the subscriber, that the particular one of the received copies is the out-of-order copy, a filter action for handling the out-of-order copy.

17. A computer program product for high availability message transmission, the computer program product comprising:
- a non-transitory computer usable storage medium having computer usable program code embodied therewith, the computer usable program code comprising:
  - computer usable program code configured to determine, at a message publisher, at least two of a plurality of message transmitters to use for transmitting a first message from the message publisher to a subscriber, wherein the determining uses voting, the voting comprising transmission of a control identifier from each of the plurality of message transmitters to the subscriber and receipt, at the message publisher, of a control response created by the subscriber using the control identifier transmitted from each of the plurality of message transmitters;
  - computer usable program code configured to create, at the message publisher for each determined message transmitter, a copy of the first message, each copy having a distinct copy number; and
  - computer usable program code configured to transmit, from the message publisher to each determined message transmitter, a distinct one of the created copies of the first message for subsequent transmission of the distinct transmitted copy from the determined message transmitter to the subscriber, the distinct copy number of the distinct transmitted copy usable by the subscriber for detecting duplicate copies of the first message.

* * * * *